(12) United States Patent
Kowalchuk

(10) Patent No.: US 9,839,177 B2
(45) Date of Patent: Dec. 12, 2017

(54) SYSTEM AND METHOD FOR CALIBRATING AN AGRICULTURAL PRODUCT METERING SYSTEM

(75) Inventor: Trevor Lawrence Kowalchuk, Saskatoon (CA)

(73) Assignee: CNH Industrial Canada, Ltd., Saskatoon, Saskatchewan (CA)

(*) Notice: Subject to any disclaimer, the term of this patent is extended or adjusted under 35 U.S.C. 154(b) by 1375 days.

(21) Appl. No.: 13/040,799

(22) Filed: Mar. 4, 2011

(65) Prior Publication Data
US 2012/0226461 A1    Sep. 6, 2012

(51) Int. Cl.
G01F 19/00    (2006.01)
G01F 25/00    (2006.01)
A01C 7/10     (2006.01)
G01G 11/08    (2006.01)

(52) U.S. Cl.
CPC .............. *A01C 7/107* (2013.01); *A01C 7/102* (2013.01); *G01F 25/0092* (2013.01); *G01G 11/08* (2013.01)

(58) Field of Classification Search
CPC ........... A01C 7/102; A01C 21/00; A01C 7/10; A01B 79/005; C05F 17/0072; G01G 11/08
See application file for complete search history.

(56) References Cited

U.S. PATENT DOCUMENTS

| | | | |
|---|---|---|---|
| 4,225,930 A | 9/1980 | Steffen | |
| 4,570,491 A | 2/1986 | Machnee | |
| 5,621,666 A | 4/1997 | O'Neall et al. | |
| 5,638,285 A | 6/1997 | Newton | |
| 5,902,966 A | 5/1999 | VonMuenster | |
| 5,956,255 A | 9/1999 | Flamme | |
| 6,003,455 A | 12/1999 | Flamme et al. | |
| 6,009,354 A | 12/1999 | Flamme et al. | |
| 6,024,035 A | 2/2000 | Flamme | |
| 6,070,539 A | 6/2000 | Flamme et al. | |
| 6,091,997 A | 7/2000 | Flamme et al. | |
| 6,093,926 A | 7/2000 | Mertins et al. | |
| 6,170,704 B1 | 1/2001 | Nystrom | |
| 6,285,938 B1 | 9/2001 | Lang et al. | |

(Continued)

FOREIGN PATENT DOCUMENTS

| | | |
|---|---|---|
| CA | 2311698 | 12/2001 |
| DE | 29613866 U1 | 11/1996 |
| EP | 0191287 | 8/1986 |

OTHER PUBLICATIONS

EP0191287 Machine Translation.*
EP1275282 Machine Translation.*

*Primary Examiner* — Sujoy Kundu
*Assistant Examiner* — L. Anderson
(74) *Attorney, Agent, or Firm* — Rebecca L. Henkel; Rickard K. DeMille

(57) ABSTRACT

A system for calibrating an agricultural product metering system is provided including a calibration unit configured to be mounted to the agricultural product metering system. The calibration unit includes a load cell configured to measure a calibration weight of product exiting the agricultural product metering system, and the calibration unit is configured to output signals indicative of the calibration weight of the product. The calibration system also includes a controller configured to receive the signals and to calculate a product flow rate based on the calibration weight.

18 Claims, 4 Drawing Sheets

(56) References Cited

U.S. PATENT DOCUMENTS

| | | |
|---|---|---|
| 6,534,728 B1 | 3/2003 | Spikings |
| 6,851,377 B2 | 2/2005 | Mayerle et al. |
| 7,225,060 B2 | 5/2007 | O'Connor et al. |
| 7,270,065 B2 | 9/2007 | Conrad |
| 7,478,603 B2 | 1/2009 | Riewerts et al. |
| 7,742,862 B2 | 6/2010 | Anderson et al. |
| 7,765,944 B2 | 8/2010 | Wilson |
| 2002/0170476 A1 | 11/2002 | Bogner et al. |
| 2004/0244659 A1 | 12/2004 | Mayerle et al. |
| 2009/0271136 A1 | 10/2009 | Beaujot et al. |

\* cited by examiner

SYSTEM AND METHOD FOR CALIBRATING AN AGRICULTURAL PRODUCT METERING SYSTEM

BACKGROUND

The invention relates generally to a system and method for calibrating an agricultural product metering system.

Generally, seeding implements are towed behind a tractor or other work vehicle. These seeding implements typically include one or more ground engaging tools or openers that form a seeding path for seed deposition into the soil. The openers are used to break the soil to enable seed deposition. After the seeds are deposited, each opener is followed by a packer wheel that packs the soil on top of the deposited seeds.

In certain configurations, an air cart is used to meter and deliver product (e.g., seeds, fertilizer, etc.) to ground engaging tools within the seeding implement. Certain air carts include a metering system configured to deliver metered quantities of product into an airflow that transfers the product to the openers. To ensure that a desired quantity of product is delivered, a calibration procedure may be performed to calibrate rotation of meter rollers within the metering system to a mass flow rate of product to the openers. Some calibration procedures involve user intervention throughout the process. For example, a user may attach a bag to the metering system to collect expelled product. The user may then instruct the metering system to rotate the meter rollers through a desired number of rotations (e.g., 50, 100, 150, 200, etc.). Next, the user may weigh the collected product and enter the weight into a user interface. A controller may then automatically compute a calibration that associates product mass flow rate with rotation of the meter rollers. Such user intervention may be time consuming, and may result in inaccurate calibrations, thereby causing too much or too little product to be delivered.

BRIEF DESCRIPTION

In one embodiment, a system for calibrating an agricultural product metering system is provided including a calibration unit configured to be mounted to the agricultural product metering system. The calibration unit includes a load cell configured to measure a calibration weight of product exiting the agricultural product metering system, and the calibration unit is configured to output signals indicative of the calibration weight of the product. The calibration system also includes a controller configured to receive the signals and to calculate a product flow rate based on the calibration weight.

In another embodiment, a system for calibrating an agricultural product metering system is provided including a calibration unit configured to be mounted to the agricultural product metering system. The calibration unit includes a load cell configured to measure a calibration weight of product exiting the product metering system. The calibration unit is configured to output signals indicative of the calibration weight of the product.

In a further embodiment, a method for calibrating an agricultural product metering system is provided including transmitting a first signal to a meter roller to activate the meter roller and rotating the meter roller to output product from the agricultural product metering system in response to the first signal. The method also includes receiving a second signal from the agricultural product metering system indicating a calibration weight of the product output and computing a product flow rate based on the calibration weight.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
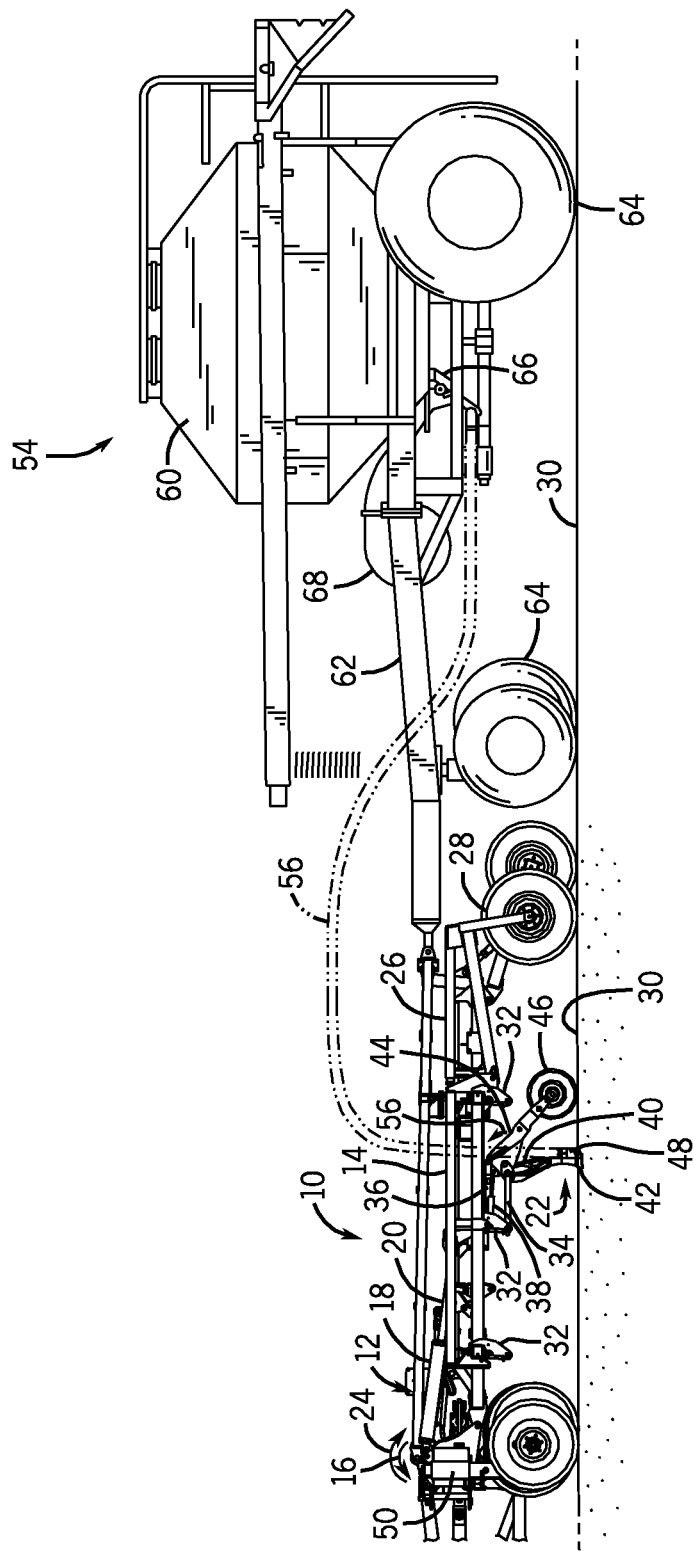
FIG. 1 is a side view of an exemplary air cart which may employ an embodiment of an automatic product calibration system.

FIG. 1 is a side view of an air cart, which may employ an embodiment of an automatic product calibration system. In the illustrated embodiment, an implement 10 includes a frame actuator 12 configured to rotate a tool frame 14 in an upward direction 16 to transition the frame 14 from the illustrated working position to a non-working position. For example, hydraulic pressure may be applied to a rod end of a barrel 18, thereby driving a piston rod 20 to retract. Because the piston rod 20 is coupled to the tool frame 14, retraction of the piston rod 20 will urge the frame 14 to rotate in the upward direction 16. With the frame 14 in the non-working position, the row units 22 will disengage the soil, thereby facilitating transport of the implement 10 across a field. In addition, a flow of product (e.g., seeds, fertilizer, etc.) to the row units 22 may be temporarily suspended while the frame 14 is in the non-working position. Consequently, the implement 10 may be moved across a field (e.g., turned at a headland) without depositing product within the soil.

Conversely, the frame 14 may be transitioned to the working position by applying hydraulic pressure to a cap end of the barrel 18, thereby driving the piston rod 20 to extend. Because the piston rod 20 is coupled to the tool frame 14, extension of the piston rod 20 will urge the frame 14 to rotate in a downward direction 24. With the frame 14 in the illustrated working position, the row units 22 engage the soil, thereby facilitating seed deposition into the soil. As illustrated, the implement 10 includes a wheel assembly 26 having a wheel 28 which contacts the soil surface 30. Because the tool frame 14 may rotate in the direction 16 and/or 24, contact between the wheel 28 and the soil surface 30 may drive the tool frame 14 toward an orientation substantially parallel to the soil surface 30. Consequently, each row unit 22 may be properly positioned for seed and/or fertilizer deposition into the soil. In the present embodiment, the row units 22 are coupled to respective mounting brackets 32 on the tool frame 14. While a single row unit 22 is shown for clarity, it should be appreciated that a row unit may be coupled to each mounting bracket 32 on the frame 14. For example, in certain embodiments at least 2, 4, 6, 8, 9, 10, 12, 14, 16, 18, 20, or more row units 22 may be coupled to each tool frame 14.

As illustrated, the row unit 22 includes a first member 34, a second member 36, and a tool actuator such as an actuating cylinder 38 (e.g., hydraulic and/or pneumatic piston-cylinder assembly) coupled to the mounting bracket 32. The cylinder 38 may be fluidly coupled to a fluid power supply that provides a flow of pressurized fluid which displaces a piston rod extending from the cylinder. It should be appreciated that the fluid power supply may be hydraulic or pneumatic, thereby powering the hydraulic or pneumatic cylinder 38. The mounting bracket 32 is configured to interface with the tool frame 14, thereby securing the row unit 22 to the implement 10. For instance, multiple row units 22 may be mounted in parallel along the tool frame 14. In the present configuration, the first member 34, the second member 36, and the mounting bracket 32 form elements of a parallel linkage, also known as a four bar linkage. As will be appreciated, components of the row unit 22, such as the mounting bracket 32, first member 34 and second member 36, may be made of any suitable material, such as steel.

The cylinder 38 is attached to a shank 40 via a pin at the end of the piston rod. The shank, in turn, is coupled to the ground engaging tool 42 via fasteners which enable height adjustment of the ground engaging tool 42 such that seeding depth may be varied. A pin is coupled to the first member 34 and the shank 40, enabling the shank 40 to pivotally rotate about the pin as the cylinder 38 extends and retracts. Accordingly, the ground engaging tool 42 moves in a downward or upward direction based upon extension or retraction of the cylinder 38. Consequently, the tool actuator/cylinder 38 is configured to vary a penetration depth of the ground engaging tool 42 into the soil 30 independently of a distance between the tool frame 14 and the soil 30. The shank 40 may feature several holes to receive a pin coupling the end of the cylinder 38 to the shank 40. The adapter holes may be used to adjust the angle of the cylinder 38 with respect to the parallel linkage assembly, thereby changing the angle and magnitude of cylinder forces.

In the present embodiment, partially relieving pressure to a cap end of the cylinder 38 will reduce the downward force applied by a packer wheel assembly 44. In addition, applying pressure to a rod end of the cylinder 38 will raise the packer wheel assembly 44, and will eventually lift the packing wheel 46 from the terrain. As will be appreciated, the packer wheel assembly 44 is configured to establish a desired penetration depth of the ground engaging tool 42 into the soil 30. In the present embodiment, the packer wheel assembly 44 may facilitate height adjustment of the packer wheel 46, in the form of a fastener and slot or an equivalent structure. To facilitate seed deposition during operation, the ground engaging tool 42 is coupled to a seed tube 48. As discussed in detail below, the seed tube is configured to receive a flow of product from a product metering system.

As a result of this exemplary row unit configuration, the ground engaging tool 42 may be transitioned between a working position and a non-working position based on extension and retraction of the tool actuator/cylinder 38. As previously discussed, retraction of the cylinder 38 induces the ground engaging tool 42 to rotate in an upward direction, thereby extracting the ground engaging tool 42 from the soil, and transitioning the tool 42 toward the non-working position. Moving each ground engaging tool 42 into the non-working position facilitates transport of the seeding implement 10 by reducing the draft force associated with each tool 42. In addition, a flow of product (e.g., seeds, fertilizer, etc.) to the row unit 22 may be temporarily suspended when the ground engaging tools 42 are in the non-working position. Consequently, the seeding implement 10 may be moved across a field (e.g., turned at a headland) without depositing product within the soil.

Conversely, each ground engaging tool 42 may be transitioned toward the working position by extending the tool actuator/cylinder 38, thereby driving the ground engaging tool 42 to rotate in a downward direction. As will be appreciated, while the ground engaging tool 42 is in the working position, the tool 42 may excavate a trench into the soil as the implement 10 traverses the field. Once a trench has been excavated, the product delivery system may deposit seeds and/or fertilizer into the soil via the seed tube 48. The packer wheel 46 may then close the trench, thereby forming a seed row suitable for crop development.

While the illustrated embodiment includes a frame actuator 12 and a tool actuator 38, it should be appreciated that alternative embodiments may only include one type of actuator 12 or 38. For example, in certain embodiments, the ground engaging tools 42 may be fixed relative to the tool frame 14. In such embodiments, the frame actuator 12 may rotate the tool frame 14 in the directions 16 and 24 to transition the ground engaging tools between the working and non-working positions. In alternative embodiments, the orientation of the tool frame 14 may be fixed relative to a tool bar 50. In such embodiments, the tool actuators 38 may transition the ground engaging tools 42 between the working and non-working positions.

As illustrated, the air cart 54 is coupled to the implement 10 via the frame 14. Consequently, the air cart 54 is towed behind the implement 10 during planting operations and during transport. In alternative embodiments, the air cart 54 may be towed directly behind a tow vehicle, with the implement 10 towed behind the air cart 54. In the present embodiment, product (e.g., seeds and/or fertilizer) is transferred from the air cart 54 to the row unit 22 via a flow of air passing through a pneumatic seed distribution hose 56. For implements 10 with multiple row units 22, separate hoses 56 and/or a distribution system may be employed to transfer product from the air cart 54 to each row unit 22. Furthermore, in certain embodiments, the implement 10 may include one or more distribution headers with at least one hose entering each distribution header, and multiple hoses exiting the distribution headers to enable product to flow to each row unit 22. In such embodiments, the hoses extending from the air cart to the distribution headers may have a larger diameter than the hoses extending from the distribution headers to each row unit 22. For example, the hoses extending to the distribution headers may have a diameter of about 2.5 inches, while the hoses extending to each row unit 22 may have a diameter of about 1.0 inches. The illustrated air cart 54 includes a storage tank 60, a frame 62, wheels 64, the product metering system 66 and an air source 68. In certain configurations, the storage tank 60 includes multiple compartments for storing various flowable particulate materials. For example, one compartment may include seeds, and another compartment may include a dry fertilizer. In such configurations, the air cart 54 is configured to deliver both the seeds and fertilizer to the implement 10. The frame 62 includes a towing hitch configured to couple to the implement 10 or tow vehicle. Seeds and/or fertilizer within the storage tank 60 are gravity fed into the product metering system 66.

In the present embodiment, the product metering system 66 includes meter rollers to regulate the flow of material from the storage tank 60 into an air flow provided by the air source 68. The air flow then carries the material to the implement 10 (such as with one or more hoses), thereby supplying the row units 22 with seeds and/or fertilizer for deposition within the soil. As discussed in greater detail below, a controller within either the air cart 54, implement 10, or tow vehicle may be configured to coordinate calibration of the product metering system 66 using a product calibration system which may increase accuracy and decrease the time required for calibration.

Figure 2:
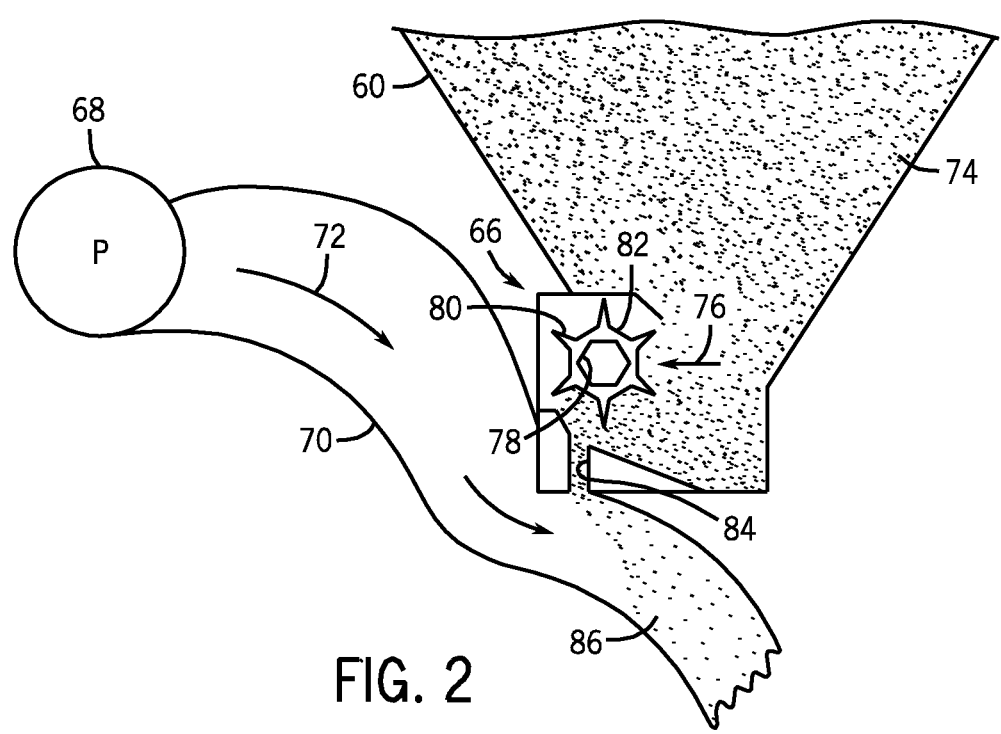
FIG. 2 is a schematic diagram of an exemplary product metering system which may be used within the air cart of FIG. 1.

FIG. 2 is a schematic view of a product metering system 66 which may employ a product calibration system. As illustrated, the air source 68 is coupled to a conduit 70 configured to enable air 72 to flow past the product metering system 66. In other embodiments, the conduit 70 may include multiple conduit sections with one conduit section coupling the air source 68 to the top of the product metering system 66 and another conduit section coupling the bottom of the product metering system 66 to the implement. In such a configuration air 72 flows through the product metering system 66. The air 72 enters the product metering system 66, combines with the metered product, and exits the product metering system 66 as a mixture of product and air.

The air source 68 may be a pump or blower powered by an electric or hydraulic motor, for example. Flowable particulate material 74 (e.g., seeds, fertilizer, etc.) within the storage tank 60 flows by gravity into the product metering system 66. The product metering system 66 includes a continuous meter roller 76. However, in certain embodiments, more than one meter roller 76 may be configured to regulate the flow of material 74 into the air flow 72. In such embodiments, the product metering system 66 may include multiple meter rollers 76 disposed adjacent to one another along a longitudinal axis of the rollers 76. For example, certain product metering systems 66 include seven meter rollers 76. Such systems 66 are known as "7-run" metering assemblies. However, alternative embodiments may include more or fewer meter rollers 76, e.g., 5, 6, 7, 8, 9, or more.

Each meter roller 76 includes an interior cavity 78 configured to receive a shaft that drives the meter roller 76. In the present embodiment, the cavity 78 has a hexagonal cross section. However, alternative embodiments may include various other cavity configurations (e.g., triangular, square, keyed, splined, etc.). The shaft is coupled to a drive unit, such as an electric or hydraulic motor, configured to rotate the meter rollers 76. Alternatively, in certain embodiments, the meter rollers 76 may be coupled to a wheel by a gear assembly such that rotation of the wheel drives the meter rollers to rotate. Such a configuration will automatically vary the rotation rate of the meter rollers based on the speed of the air cart.

Each meter roller 76 also includes multiple flutes 80 and recesses 82. The number and geometry of the flutes 80 are particularly configured to accommodate the material 74 being distributed. The illustrated embodiment includes six flutes 80 and a corresponding number of recesses 82. Alternative embodiments may include more or fewer flutes 80 and/or recesses 82. For example, the meter roller 76 may include 2, 4, 6, 8, 10, 12, 14, 16, 18, 20, or more flutes 80 and/or recesses 82. In addition, the depth of the recesses 82 and/or the height of the flutes 80 are configured to accommodate the material 74 within the storage tank 60. For example, a meter roller 76 having deeper recesses 82 and fewer flutes 80 may be employed for larger seeds, while a meter roller 76 having shallower recesses 82 and more flutes 80 may be employed for smaller seeds. Other parameters such as flute pitch (i.e., rotation relative to a longitudinal axis) and flute angle (i.e., rotation relative to a radial axis) may also be varied in alternative embodiments.

For a particular meter roller configuration, the rotation rate of the meter roller 76 controls the flow of material 74 into the air stream 72. Specifically, as the meter roller 76 rotates, material is transferred through an opening 84 in the product delivery system 66 into the conduit 70. The material then mixes with air from the air source 68, thereby forming an air/material mixture 86. The mixture then flows to the row units 22 of the implement 10 via the pneumatic conduits 56, where the seeds and/or fertilizer are deposited within the soil. In the present embodiment, the product metering system 66 may be deactivated by stopping rotation of the meter rollers 76, thereby substantially blocking the flow of material through the opening 84. Conversely, the product metering system 66 may be activated by engaging rotation of the meter rollers 76. In this manner, product flow to the row units 22 may be temporarily suspending while the ground engaging tools 42 are in the non-working position.

As will be appreciated, a controller may be utilized to control the rotation rate of the meter roller 76. For example, the controller may be configured to regulate a product flow rate by adjusting the rotation rate of the meter roller 76. Furthermore, the product metering system 66 may include a product calibration system. With such a system, a load cell may be attached to the storage tank 60 near the opening 84. Additionally, a calibration container (e.g., plastic bag, box, etc.) may be positioned beneath the opening 84, and configured to capture the material 74 that exits the opening. Once the container is properly positioned, an operator may press a calibration button to cause the meter roller 76 to rotate, thereby dispensing product as long as the calibration button is pressed. Alternatively, the controller may be transitioned to a calibration mode in which the controller instructs the meter roller 76 to rotate a predetermined number of revolutions (e.g., 50, 100, 150, 200, etc.). As the meter roller 76 rotates, the material is captured by the container. A user may then transfer the container to the load cell which communicates a calibration weight (i.e., a calibration number) to the controller to determine an appropriate rotation rate for the meter roller 76. Specifically, once the controller associates the product weight with the number of meter roller revolutions, the controller may compute the weight of product expelled with each revolution. Consequently, the controller may automatically adjust the rotation rate of the meter roller 46 to achieve a desired product flow rate during planting operations. In such a system, which is described in greater detail below, calibration may be completed more quickly and with greater accuracy than procedures involving manually measuring the weight of the container and manually inputting the weight into a user interface.

Figure 3:
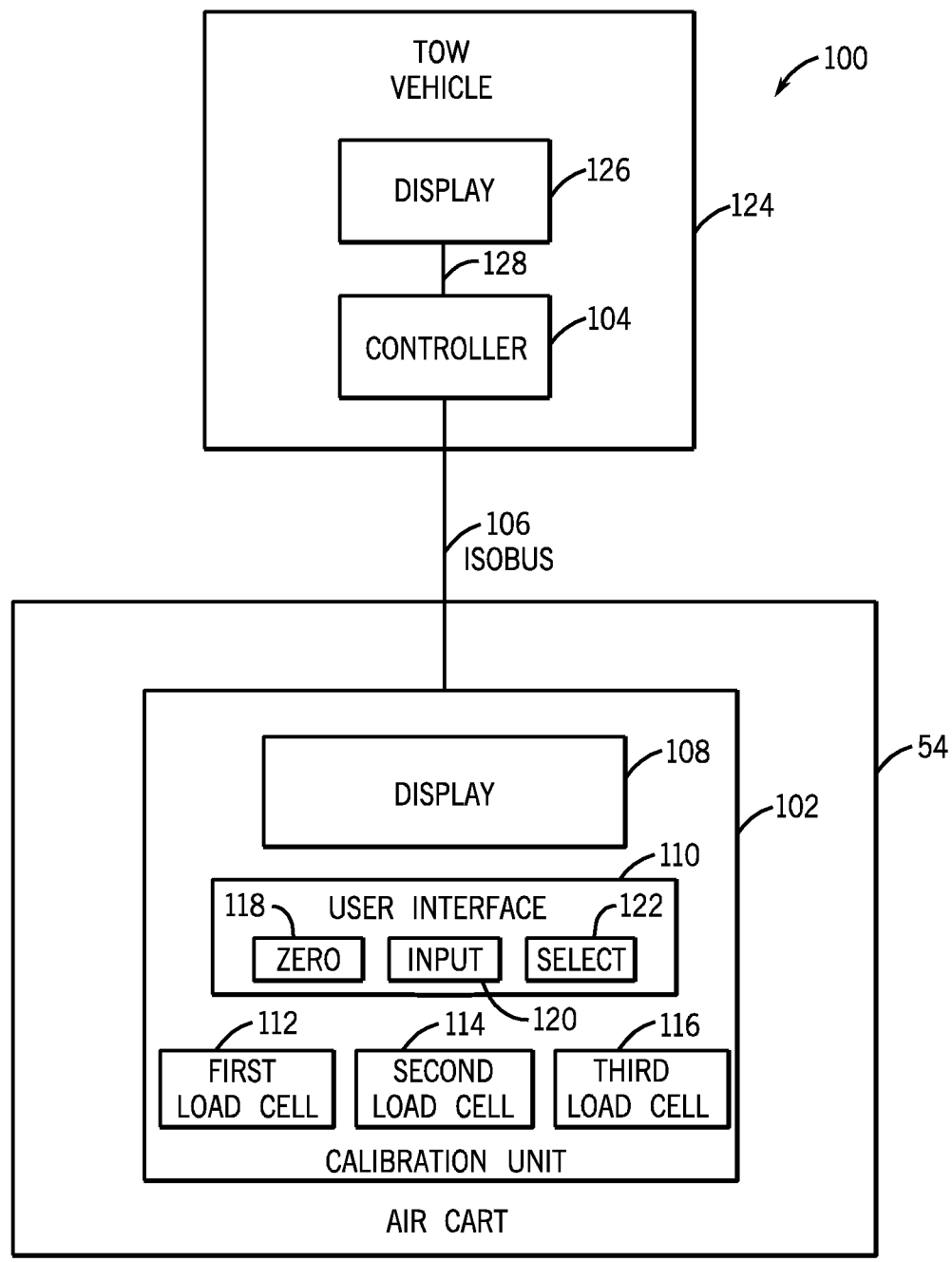
FIG. 3 is a schematic diagram of an exemplary product calibration system including a calibration unit and a controller.

FIG. 3 is a schematic diagram of an exemplary product calibration system 100 including a calibration unit 102 and a controller 104. In the illustrated embodiment, the calibration unit 102 is configured to communicate with the controller 104 via cables 106 using an ISOBUS communication protocol. The ISOBUS communication protocol may facilitate communication with other systems throughout the implement 10 and/or the air cart 54, thereby forming an integrated communications network. However, other communication protocols may be utilized in alternative embodiments to enable the calibration unit 102 to communicate with the controller 104.

As illustrated, the calibration unit 102 is attached to the air cart 54 (e.g., mounted to the tank 60), and includes a display 108, a user interface 110, and load cells 112, 114, 116. Although three load cells are illustrated, certain embodiments may include more or fewer load cells, such as a single load cell. The display 108 is configured to provide visual feedback to a user. For example, the display 108 may present information used during calibration, such as which load cell 112, 114, 116 is selected, a calibration weight measured by the selected load cell, and/or whether a calibration weight is accepted by the controller. By way of example, if the user selects the first load cell 112, a portion of the display 108 may be dedicated to showing the selected load cell with an indication "1." Likewise, if the user selects the second load cell 114, then the display 108 portion may show "2." It should be appreciated that the display may be integrated within the calibration unit 102, or an existing display mounted to the air cart 54 and configured to interface with the calibration unit 102. In addition, the display 108 may be an LED display, an LCD display or another type of display capable of providing visual feedback to the user.

In the illustrated embodiment, the user interface 110 includes buttons configured to facilitate calibration of the metering system, including a zeroing button 118, input buttons 120, and a select button 122. As will be appreciated, alternative embodiments may include fewer or more buttons to calibrate the metering system. The zeroing button 118 is used to set an initial weight measurement to zero prior to delivering product from the metering system to the product calibration system 100. For example, a calibration container may be attached to the first load cell 112, such as by a hook on the load cell 112. The zeroing button 118 may be pressed so that the initial weight measurement is zero. Thereafter, the calibration container may then be removed from the first load cell 112 and positioned to capture product that is delivered by the meter rollers of the product metering system. After the meter rollers rotate and product is delivered to the calibration container, the calibration container is moved back to the first load cell 112 to obtain a calibration measurement. Because the first load cell 112 was zeroed with only the calibration container attached, the calibration weight represents an accurate weight of only the product contained in the calibration container. As should be appreciated, other embodiments may position the first load cell 112 to enable the calibration container to capture product from the metering system while the calibration container is still attached to the load cell.

Likewise, the input buttons 120 may assist the user in performing calibration operations. For example, the input buttons 120 may be configured to enable the user to start a calibration cycle, enter a weight, enter a load cell number, enter a meter box number, or enter a calibration profile. For example, after a calibration container is attached to a load cell and the load cell weight measurement is zeroed, a user may position the calibration container beneath a meter roller and press a button labeled "start" to begin delivering product into the calibration container. When the metering system stops, the user may place the calibration container back on the load cell. Then, the user may look at the display 108 and verify that the weight measurement displayed is within an acceptable range and press a button labeled "accept."

Furthermore, the select button 122 enables a user to make selections such as which load cell information is being shown on the display 108, and which meter roller is proceeding through a calibration cycle. A meter box, meter roller and/or load cell may be selected by pressing the select button 122, followed by pressing the input button 120 that correlates to the desired meter box, meter roller, or load cell. For example, if a user desires to select a meter roller labeled as number two, the user may press the select button 122, followed by the numeral "2" from the input buttons 120. The result of the previous steps may select the number two meter roller for performing a calibration cycle, and show a "2" on the display 108 to represent that the number two meter roller is selected.

The first, second, and third load cells 112, 114, and 116 may be attached to the air cart 54 near the opening of the metering system. In addition, the load cells 112, 114, 116, may be constructed to enable a calibration container to be easily placed on the surface of the load cell or hung from the load cell. Furthermore, the load cells 112, 114, and 116 are configured to output signals indicative of the measured weight (also known as a calibration number) of product. These output signals may be received by the controller to determine the weight attached to each load cell. Because this configuration obviates the process of manually entering the weights into a user interface, the illustrated embodiment may substantially reduce or eliminate the possibility of providing inaccurate calibration weights to the controller.

It should be noted that the controller 104 coordinates operations of the product calibration system 100 by communicating with the calibration unit 102. For example, the controller 104 may be configured to receive a command to enter a calibration mode. Upon entering the calibration mode, the controller 104 may send directions to a display, instructing a user on the procedures associated with calibrating the metering system. Thereafter, the controller 104 may receive calibration weights/calibration numbers from the load cells, thereby enabling the controller 104 to determine a flow rate for the metering system. Furthermore, the controller 104 may include an expected range of calibration weights. If the calibration weight does not fall within the expected range, the controller may alert the user (e.g., via the display 108) and/or reject the input weight. The expected range of calibration weights may be calculated using product data and metering system data stored on the controller and/or input by a user. For example, product data and metering system data may include the product type (e.g., wheat, canola, oats, Map or Dap fertilizers, and so forth), the number of primary runs, and the meter roller section type (e.g., extra fine, course, and so forth).

As illustrated, the controller 104 is configured to be attached to a tow vehicle 124 and connected to a display 126 via a connection 128. The controller 104 may be configured to operate multiple systems in addition to the product calibration system 100. In other embodiments, the controller 104 may be integrated with the calibration unit 102, attached to the air cart 54, and configured to communicate calibration information to the display 126 in the tow vehicle. Likewise, further embodiments of the calibration unit 102 may be controlled by an existing controller within the air cart 54. In addition, the display 126 may be an ISOBUS compatible display, or another type of display capable of providing calibration information to a user, thus enabling the user to monitor the operations of the air cart 54 while remaining in the tow vehicle 124.

Figure 4:
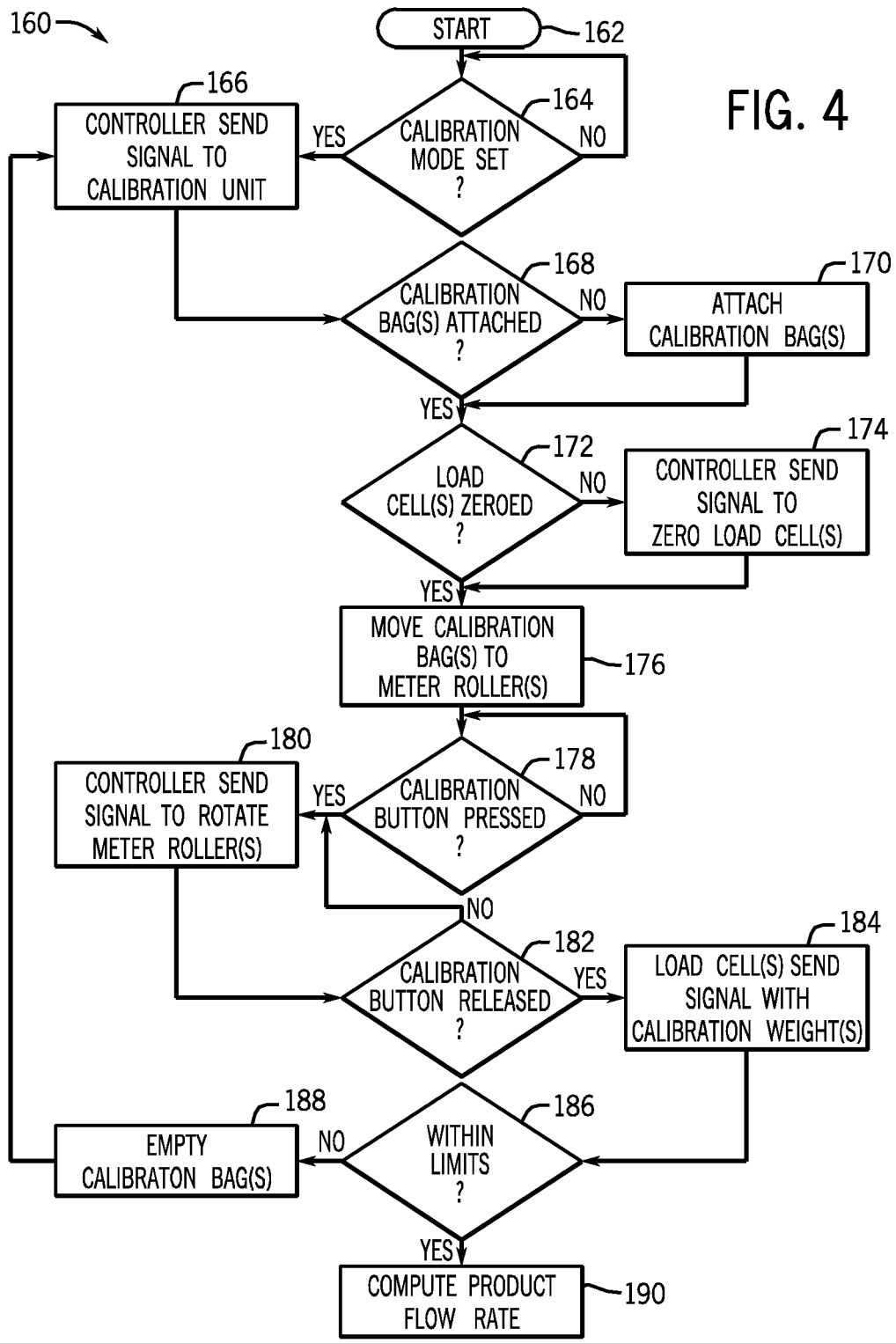
FIG. 4 is a flowchart of an exemplary method for calibrating a product metering system.

FIG. 4 is a flowchart of an exemplary method 160 for calibrating a product metering system 100. First, the calibration method begins at block 162. Then, a controller determines whether a calibration mode is set, per block 164. The controller may be set to the calibration mode using an input from a user either at the tow vehicle, or at the air cart, for example. If the calibration mode is not set, the controller continues in a loop at block 164, waiting until the calibration mode is set. If the calibration mode is set, at block 166 the controller sends a signal to a calibration unit to initialize calibration. Next, at block 168, an operator determines whether calibration bag(s) are attached to load cell(s) of the calibration unit. If calibration bag(s) are not attached to the load cell(s), at block 170, the operator attaches calibration bag(s) to the load cell(s), and the method proceeds to block 172. Although calibration bags are disclosed, any type of calibration container may be used. It should be noted that the load cell(s) are located on the air cart, which may result in greater efficiency and increased accuracy when performing calibrations. If calibration bag(s) are attached to the load cell(s), the controller and/or the operator determine whether the load cell(s) are zeroed at block 172. The load cell(s) are zeroed to enable a more accurate weight to be obtained. The load cell(s) may be zeroed manually by a user selection. However, in other embodiments where the calibration container(s) are attached to the load cell(s) and receive product from the metering system without being moved, the load cell(s) may be zeroed automatically by the controller setting the weight to zero at a time just before product is dispensed into the calibration bag(s).

At block 174, the controller sends a signal to zero the load cell(s). Once the load cell(s) are zeroed, the system continues to block 176. At block 176 the operator moves the calibration bag(s) from the load cell(s) to the meter box(es) for capturing product dispensed from the meter roller(s). Next, at block 178, the controller determines whether a calibration button is pressed by the operator. If the calibration button is not pressed, the controller continues in a loop at block 178, waiting until the calibration button is pressed. If the calibration button is pressed, at block 180 the controller sends signal(s) to rotate the meter roller(s) to dispense product into the calibration bag(s). Next, at block 182, the controller determines whether the calibration button has been released by the operator. If the operator has not released the calibration button, the method returns to block 180, where the controller continues to send signal(s) to rotate the meter roller(s). Once the operator has released the calibration button, the method continues to block 184. In other embodiments, blocks 178, 180, and 182 may be replaced with steps automatically performed by the controller. For example, the controller may transmit signal(s) to cause the meter roller(s) to turn a specific number of times and at a specific rate for the product to be dispensed. In either embodiment, the controller may calculate an estimate of the quantity of product that is being dispensed.

If the calibration button is released, the controller sends signal(s) to stop the meter roller(s) from dispensing product. The operator moves the calibration bag(s) from the meter roller(s), and attaches the bag(s) to the load cell(s). Then, at block 184, the load cell(s) send signal(s) to the controller with calibration weight(s)/calibration number(s). The controller receives the signal(s) indicating the calibration weight(s) of the product output and may display the weight for the operator to view. The controller determines whether the calibration weight(s) are within expected limits, at block 186. This verification may be accomplished by an operator visually inspecting a display, followed by the operator acknowledging that the calibration weight(s) are acceptable, or it may be accomplished by the controller, using a predetermined or calculated weight range. Furthermore, the verification may include a combination of both methods, such as the controller rejecting certain weight ranges, and the operator accepting the weight range manually if the weight is within expected limits. The weight range may be directly input to the controller, or calculated based on product information such as product size, product weight, or a combination thereof, for example. By verifying a calibration weight, the possibility of inaccurate calibrations may be substantially reduced or eliminated.

If the calibration weight(s) are not within limits, at block 188 the operator empties the calibration bag(s) and the method returns to block 166 to repeat the calibration method. If the calibration weight(s) are within limits, at block 190 the controller uses the calibration weight(s) to compute the product flow rate(s) and may store the calibration weight(s).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for calibrating and controlling an agricultural product metering system, comprising:
a controller configured to output a first signal to a drive unit to cause the drive unit to rotate a meter roller a number of times; and
a calibration unit configured to be mounted to the agricultural product metering system, wherein the calibration unit comprises a load cell configured to measure a calibration weight of product exiting the agricultural product metering system, and the load cell is configured to output a second signal indicative of the calibration weight of the product to the controller;
wherein the controller is configured to receive the second signal, to determine a product flow rate based on the second signal and the number of times, and to output a third signal to the drive unit to control a rotation rate of the meter roller based on the product flow rate.

2. The system of claim 1, wherein the calibration unit comprises a display configured to present the calibration weight of the product.

3. The system of claim 1, wherein the calibration unit comprises a user interface configured to enable a user to provide input to the calibration unit.

4. The system of claim 1, wherein the calibration unit comprises a plurality of load cells configured to measure the calibration weight of the product exiting the agricultural product metering system from a respective plurality of meter boxes.

5. The system of claim 4, wherein the calibration unit comprises a display and a user interface, wherein the user interface is configured to enable a user to select a load cell from the plurality of load cells, to select a meter to calibrate, to zero the calibration weight, to accept the calibration weight, or a combination thereof.

6. The system of claim 5, wherein the display is configured to present the selected load cell, the calibration weight, acceptance of the calibration weight, or a combination thereof.

7. The system of claim 1, wherein the controller is configured to compare the calibration weight to an expected weight range, and to indicate whether the calibration weight is outside of the expected weight range.

8. The system of claim 7, wherein the expected weight range is determined using product data and metering system data stored in the controller.

9. The system of claim 8, wherein the product data comprises product size, product weight, or a combination thereof.

10. The system of claim 1, wherein the controller and the calibration unit are communicatively coupled via an ISO-BUS communication protocol.

11. The system of claim 10, wherein the controller is configured to be attached to a tow vehicle.

12. A system for calibrating and controlling an agricultural product metering system, comprising:
- a controller configured to be attached to a tow vehicle, wherein the controller is configured to output a first signal to a drive unit to cause the drive unit to rotate a meter roller of the agricultural product metering system a number of times; and
- a calibration unit communicatively coupled to the controller and configured to be mounted to the agricultural product metering system, wherein the calibration unit comprises a load cell configured to measure a calibration weight of product exiting the agricultural product metering system, and the load cell is configured to output a second signal indicative of the calibration weight of the product to the controller;
- wherein the controller is configured to receive the second signal, to determine a product flow rate based on the second signal and the number of times, and to output a third signal to the drive unit to control a rotation rate of the meter roller based on the product flow rate;
- wherein the agricultural product metering system is mounted to an implement separate from the tow vehicle and configured to be towed by the tow vehicle.

13. The system of claim 12, wherein the calibration unit comprises a plurality of load cells configured to measure the calibration weight of the product exiting the agricultural product metering system from a respective plurality of meter boxes.

14. The system of claim 13, wherein the calibration unit comprises a display and a user interface, wherein the user interface is configured to enable a user to select a load cell from the plurality of load cells, to zero the calibration weight, to accept the calibration weight, or a combination thereof.

15. The system of claim 14, wherein the display is configured to present the selected load cell, the calibration weight, the acceptance of the calibration weight, or a combination thereof.

16. A method for calibrating and controlling an agricultural product metering system, comprising:
- outputting, via a controller, a first signal to a drive unit to cause the drive unit to rotate a meter roller a number of times to output product from the agricultural product metering system;
- receiving, via the controller, a second signal from a load cell of a calibration unit indicative of a calibration weight of the product output;
- determining, via the controller, a product flow rate based on the second signal and the number of times; and
- outputting, via the controller, a third signal to the drive unit to control a rotation rate of the meter roller based on the product flow rate.

17. The method of claim 16, comprising verifying, via the controller, that the calibration weight is within an expected weight range.

18. The method of claim 16, wherein determining the product flow rate based on the calibration weight comprises using product data in the determination.

* * * * *